(12) United States Patent
Dougherty et al.

(10) Patent No.: US 6,222,341 B1
(45) Date of Patent: *Apr. 24, 2001

(54) DUAL BATTERY CHARGE MAINTENANCE SYSTEM AND METHOD

(75) Inventors: Thomas J. Dougherty, Waukesha; William P. Segall, Grafton; Michael E. Iverson, Milwaukee, all of WI (US)

(73) Assignee: Johnson Controls Technology Company, Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,950

(22) Filed: Sep. 17, 1997

(51) Int. Cl.[7] ........................................... H02J 7/00
(52) U.S. Cl. ..................... 320/104; 370/119; 307/10.1
(58) Field of Search ................... 320/103, 104, 320/126, 119; 307/10.1, 150

(56) References Cited

U.S. PATENT DOCUMENTS

| | | | |
|---|---|---|---|
| 4,403,279 | * 9/1983 | Hirsch et al. | 323/222 |
| 4,510,431 | 4/1985 | Winkler | 320/1 |
| 5,002,840 | 3/1991 | Klebenow et al. | 429/9 |
| 5,162,164 | 11/1992 | Dougherty et al. | 429/9 |
| 5,162,720 | * 11/1992 | Lambert | 320/104 |
| 5,204,610 | 4/1993 | Pierson et al. | 320/15 |
| 5,223,351 | 6/1993 | Wruck | 429/9 |
| 5,281,904 | 1/1994 | Tomkins | 320/2 |
| 5,316,868 | 5/1994 | Dougherty et al. | 429/9 |
| 5,321,627 | 6/1994 | Reher | 364/483 |
| 5,525,891 | 6/1996 | Meyer et al. | 350/15 |
| 5,528,087 | 6/1996 | Sibata et al. | 307/66 |
| 5,549,984 | 8/1996 | Dougherty | 429/61 |
| 5,592,067 | * 1/1997 | Peter et al. | 320/103 |
| 5,637,978 | * 6/1997 | Kellett et al. | 320/104 |
| 5,668,461 | 9/1997 | Hancock et al. | 320/5 |
| 5,668,463 | * 9/1997 | Duley | 320/103 |
| 5,717,310 | * 2/1998 | Sakai et al. | 307/10.1 |
| 5,760,488 | * 6/1998 | Sonntag | 307/10.1 |
| 5,767,658 | * 6/1998 | Hayes | 320/104 |

FOREIGN PATENT DOCUMENTS

| | | |
|---|---|---|
| 41 38 943 C1 | 5/1993 | (DE) . |
| 0 753 925 A2 | 1/1997 | (EP) . |
| 2 128 044 | 4/1984 | (GB) . |
| 2 302 622 | 1/1997 | (GB) . |
| WO 88 08380 | 11/1988 | (WO) . |

OTHER PUBLICATIONS

English Translation of EP 0 753 925 A2 No month.

* cited by examiner

Primary Examiner—Shawn Riley
Assistant Examiner—Gregory J Toatley, Jr.
(74) Attorney, Agent, or Firm—Quarles & Brady LLP

(57) ABSTRACT

An electrical system of a vehicle has a starting battery and a reserve battery. The charge of the starting battery is maintained by a charge maintenance device under control of a controller which couples energy from the reserve battery to the starting battery during periods when the vehicle is not being used or during periods of operation where the starting battery voltage requires additional charge.

19 Claims, 4 Drawing Sheets

DUAL BATTERY CHARGE MAINTENANCE SYSTEM AND METHOD

FIELD OF THE INVENTION

The present invention relates generally to battery charging systems and more particularly to a system for maintaining the charge of one or more batteries in a dual-battery system.

BACKGROUND

Automobiles and other combustion engine powered vehicles typically include an electric starting motor for starting the combustion engine for operation. In this regard, the starting motor is coupled to a starting circuit which generally receives electrical energy from an on-board electric storage battery. The starting circuit selectively couples electrical energy from the battery to the starting motor that operates to cycle the engine to initiate sustained operation. In common vehicle applications, the battery also provides electrical energy to a variety of electric power consuming devices such as engine control electronics, lighting systems, and vehicle accessories.

Traditional batteries for these applications, often referred to as starting, lighting and ignition (SLI) batteries, are multi-cell, lead-acid batteries. That is, the batteries are constructed from lead plates pasted with active material and arranged into stacks. The stacks are inserted into partitioned cell compartments of a battery container, electrically connected, and flooded with dilute acid electrolyte. SLI batteries of this construction are more than adequate for providing the relatively high power demand required of engine starting as well as the relatively low power demand to maintain electrical accessories during both vehicle operation and periods of non-operation. However, because of the seemingly disparate functions the SLI battery is required to perform, short duration high-power output and long duration low-power output, the battery design can not be optimized for performing either of these tasks. An additional drawback of these batteries is relatively low specific energy (kilo-watt hours/grams (kWh/g)) as compared to other battery constructions owing to the weight of the lead plates and the liquid electrolyte.

There has been suggested a battery system for vehicle use which includes two batteries. A first battery in the system, a starting battery, is optimized for engine starting, that is, designed specifically for short duration, high-power output. A second battery in the system, a reserve battery, is optimized for operating and maintaining non-starting electrical loads. An advantage of such a system is that the starting battery may be made smaller and lighter yet capable of provide a high power output for a short period of time. In addition, the reserve battery may be made smaller and lighter yet capable of satisfying the relatively low power requirements of the vehicle accessories. In combination, the two battery system may require less space and weigh less than a single traditional SLI battery.

A limitation of such a system lies with the starting battery. Small, light weight batteries capable of high operational discharge rates typically have high self-discharge rates. That is, left unattended, the starting battery will self-discharge to a level where it is incapable of providing sufficient electrical energy for starting the engine. During vehicle operation, the starting battery is charged using the vehicle electrical system. Therefore, where the vehicle is regularly used starting battery self-discharge is not a concern. However, if the vehicle is left unused for an extended period of time or the vehicle is used for very short trips during which time the vehicle electrical system does not sufficiently charge the starting battery, the starting battery may become discharged leaving the operator stranded.

Therefore, a dual-battery system for vehicle starting and operation that provides the advantages of reduced size and weight and yet overcomes the disadvantages of starting battery self-discharge is highly desirable.

DETAILED DESCRIPTION OF THE PREFERRED EMBODIMENTS

The present invention is described in terms of several preferred embodiments adapted for use in a dual-battery based vehicle electrical system. The batteries in the system provide electrical energy for various vehicle operation functions and receive charging from the vehicle electrical system. It will be appreciated that the scope of the invention is not limited vehicle applications or dual-battery systems. For example, the invention may find application in any multiple battery system. The invention may also find application in a vehicle starting system in which a starting battery is replaced with a starting capacitor for providing starting energy.

Figure 1:
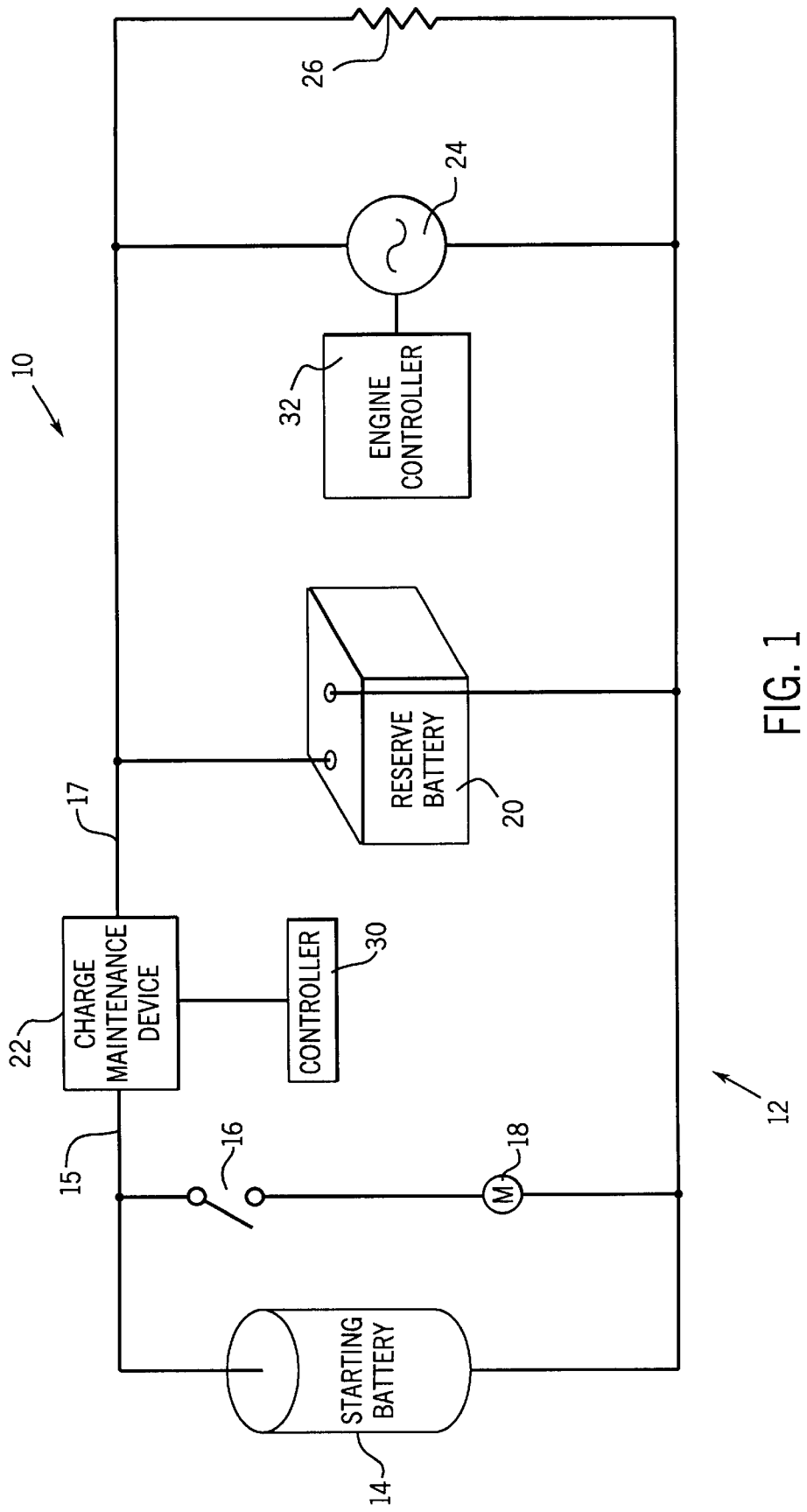
FIG. 1 is a schematic diagram of an dual-battery system for vehicle starting and operation in accordance with a preferred embodiment of the present invention.

Referring to FIG. 1 vehicle electrical system 10 includes battery system 12 having a starting battery 14 coupled for providing electrical energy through switch 16 to engine starting motor 18. Starting motor 18 is mechanically coupled to the engine of the vehicle (not shown) for starting the engine as is well known in the art. Starting battery 14 is preferably a high-rate battery. Such a battery is shown and described in commonly assigned U.S. patent application Ser. No. 08/870,803 Entitled: "Modular Electric Storage Battery," filed Jun. 6, 1997, the disclosure of which is hereby expressly incorporated herein by reference. Starting battery 14 is also coupled through charge maintenance device 22 to reserve battery 20 and to the remainder of electrical system 10.

Reserve battery 20 is preferably of the absorptive glass mat (AGM) type construction having high reserve capacity. That is, reserve battery 20 is adapted to provide a relative low-rate discharge for an extended period of time. Reserve battery 20 is coupled to electrical system 10, and particularly to vehicle loads 26, for providing electrical energy during normal vehicle operation and during idle periods.

Each of starting battery 14 and reserve battery 20 are coupled to alternator 24. Alternator 24 is mechanically coupled to the engine in a manner that is well know in the art and during periods of vehicle operation provides electrical energy for charging starting battery 14 and reserve battery 20. Alternator 24 also provides electrical energy to vehicle loads 26 during normal operation. Alternator 24 output is controlled through field voltage regulation or other suitable means under operation of engine controller 32 as is known in the art.

In accordance with a preferred embodiment of the present invention, charge maintenance device 22 is provided and under control of controller 30 couples energy from reserve battery 20 to starting battery 14 via conductors 15 and 17 for maintaining the charge status of starting battery 22. For example, energy may be channeled to starting battery 14 during periods when the vehicle is not being used or during periods of operation where the starting battery voltage requires additional charge. Since a relatively small power draw from reserve battery 20 may be used to maintain starting battery 14 at a substantially full state-of-charge without adversely effecting the charge status of reserve battery 20, the self-discharge characteristic of starting battery 14 may be overcome.

Figure 2:
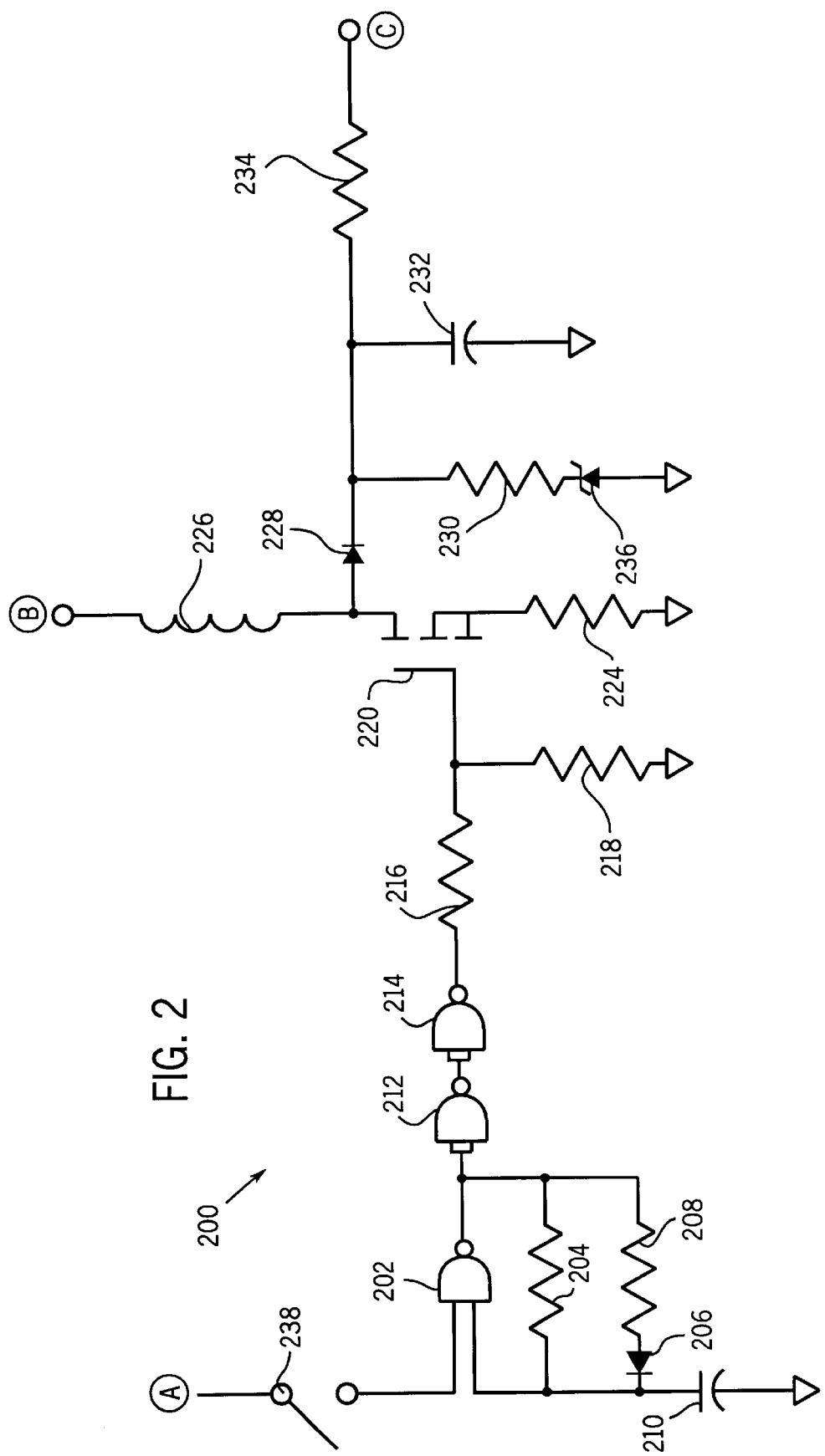
FIG. 2 is a diagram of a charge control circuit in accordance with a preferred embodiment of the present invention.

Referring to FIG. 2 a preferred embodiment of charge maintenance device 22 is a circuit 200 providing a low level, milli-amp level, current pulse from reserve battery 20 to starting battery 14. Circuit 200 includes operatively coupled to form a pulse generator NAND gates 202, 212 and 214, resistors 204 and 208, diode 206 and capacitor 210. Reserve battery 20 is coupled through switch 238 to a first input of NAND gate 202. The second input of NAND gate 202 and the output of NAND gate 202 are coupled to resistors 204 and 208, diode 206 and capacitor 210 and collectively form an oscillator. That is, when switch 236 is closed, NAND gate 202 produces a periodic pulse train. IN the preferred embodiment the precise frequency of the pulse train is not important to operation of circuit 200, but it is preferably set at about 5–30 kilohertz (kHz). The pulse train is buffered and amplified through NAND gates 212 and 214 and coupled via a gate resistor network including resistors 216 and 218 to the gate of transistor 220 for periodic on/off cycling. In the preferred embodiment transistor 220 is a field effect transistor (FET) but it should be understood that any suitable switching device may be used without departing from the fair scope of the invention.

With transistor 220 in the on position, current is allowed to flow through inductor 226, which is coupled to reserve battery 20 at "B", transistor 220 and resistor 224. When transistor 220 is switched off, a voltage buildup within inductor 226 is dissipated through current limit resistor 234 into starting battery 14 coupled at "C" for providing a charge maintenance current. Diode 228 provides reverse current flow protection, and resistor 230 and zener diode 236 provide a voltage dumping path for protecting transistor 220 from excessive voltage buildup. Zener diode 236 is preferably a 15–16 volt device for clamping inductor 226 voltage at between 15 and 16 volts.

Controller 30 acts to open and close switch 238 for activating and deactivating circuit 200. It is possible to allow circuit 200 to operate continuously without adverse affect to either starting battery 14 or reserve battery 20. However, to maximize the standby capability of the system in the preferred embodiment circuit 200 is activated when starting battery 14 voltage falls below a threshold. For example, controller 30 may be adapted to sense starter battery 14 voltage and when it falls below approximately 12.75 volts to close switch 238 to activate circuit 200. Once activated, controller 30 initiates a timer, and circuit 200 is allowed to operate for between 6–24 hours depending capacity of starting battery 14 and the ability of circuit 200 to provide charge current to starting battery 14. At the conclusion of the time period, switch 238 is opened deactivating circuit 200. Controller 30 might also be adapted to sense when starting battery 14 voltage exceeds a threshold value for deactivating circuit 200, or controller 30 may continuously activate circuit 200 in response to various operating conditions, for example, environmental conditions such as extreme ambient cold.

Controller 30 is shown in FIG. 1 separate from engine controller 32. It will be appreciated that the function of controller 30 may be implemented within engine controller 32 or another on-board vehicle controller without departing from the fair scope of the invention. It will be further appreciated that controller 30 may be adapted to monitor in a sophisticated manner the state-of-charge of starting battery 14 for initiating circuit 200 operation. An example of an apparatus and method for state-of-charge monitoring is shown and described in commonly assigned U.S. Pat. No. 5,321,627 and U.S. patent application Ser. No. 08/549,432 now abandoned the disclosures of which are hereby expressly incorporated herein by reference. Also, though not shown in FIG. 2, a direct current path is provided for charging starting battery 14 directly from alternator 24 output during vehicle operation.

Figure 3:
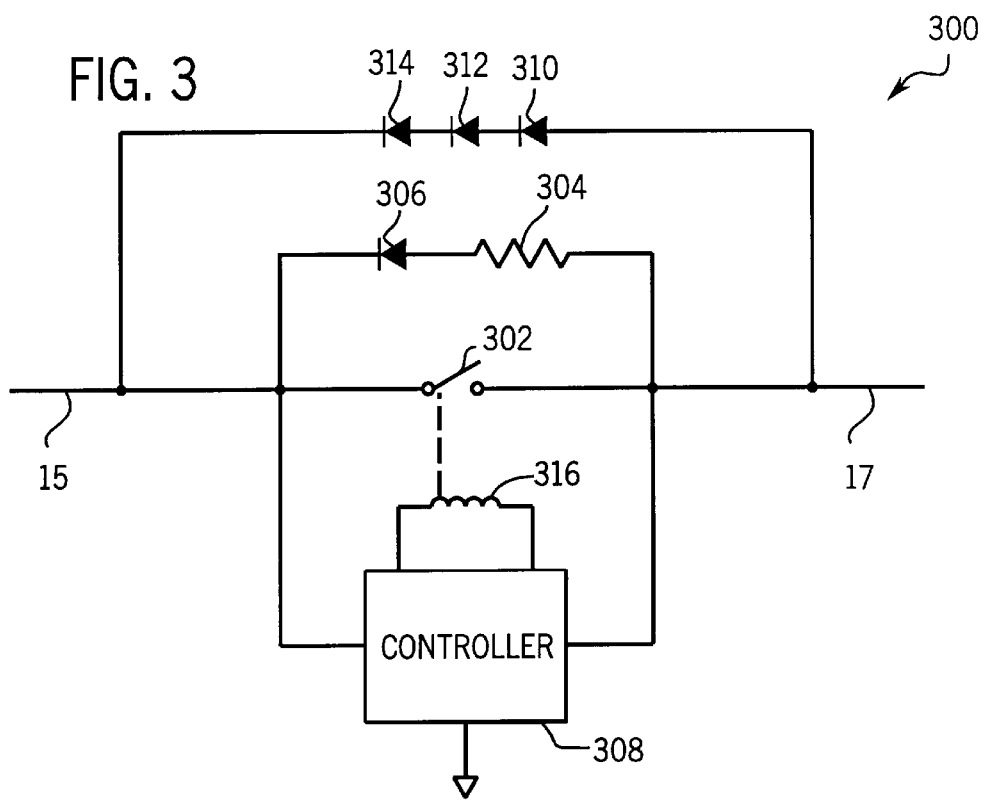
FIG. 3 is a diagram of a charge control circuit in accordance with a preferred embodiment of the present invention.

Referring now to FIG. 3, and alternate preferred implementation of charge maintenance device 22 is a circuit 300 shown for use in a system where starting battery 14 and reserve battery are of different voltages. It is contemplated within the scope of the present invention that the starting battery, because of its high-rate characteristics, may be specified at, for example, 10 volts as compared to a traditional 12 volt starting battery. Reserve battery 20 is maintained in the exemplary embodiment as a 12 volt battery. Circuit 300 includes a current limit resistor 304 and blocking diode 306. Since reserve battery 20 is of a sufficiently higher potential than starting battery 14, a current flow is initiated through resistor 304 for maintaining the charge of starting battery 14.

Circuit 300 further includes a current path existing of diodes 310, 312 and 314. The inherent voltage drop across diodes 310–314 substantially inhibits a current flow through this path when the vehicle is not operating, i.e., alternator 24 is not producing energy. However, when the vehicle is operating and the alternator is producing electricity at approximately 14 volts, current does flow through diodes 310–314 for rapid charging of starting battery 14.

As can be further seen in FIG. 3, relay 302 provides for selective coupling of starter battery 14 and reserve battery 20. Relay 302 is closed upon energization of coil 316 by controller 308 (controller 308 is shown in FIG. 3, but it should be understood that its function can be incorporated into controller 30). Controller 308 is coupled to sense both starting battery 14 voltage and reserve battery 20 voltage. When closed, starting battery 14 and reserve battery 20 are coupled in parallel and in this arrangement, reserve battery 20 is made available to provide additional energy for starting the vehicle. Conditions such as low starting battery 14 voltage or cold ambient conditions may be sensed by controller 308 for closing relay 302.

Figure 4:
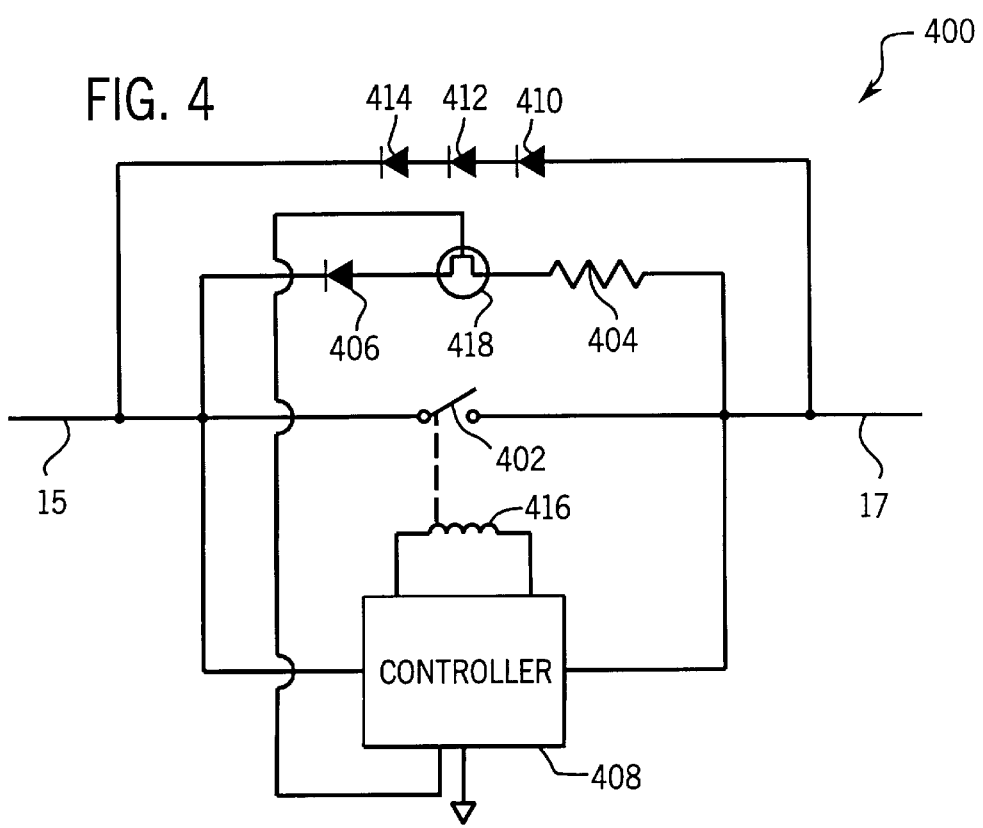
FIG. 4 is a diagram of a charge control circuit in accordance with a preferred embodiment of the present invention.

FIG. 4 shows a circuit similar to that shown in FIG. 3 for use in a system where starting battery 14 and reserve battery are of different voltages, again reserve battery 20 being at least about 2 volts greater than starting battery 14. Circuit 400 includes a current limit resistor 404 and blocking diode 406 for providing a current flow path to starting battery 14 for maintaining the charge of starting battery 14. Circuit 400 further includes switching transistor 418 operating under the control of controller 408 (controller 408 is shown separate from controller 30, but its functions may easily be incorporated into controller 30) which allows controller 408 to open the current path between reserve battery 20 and starting battery 14. Controller 408 will preferably operate as described above for selectively opening and closing the current path in response to starting battery 14 voltage, a sensed state-of-charge or other operating condition. Circuit 400 also includes a current path existing of diodes 410, 412 and 414 for direct charging of starting battery 14 as described, and relay 402 and coil 416 for selective coupling of starter battery 14 and reserve battery 20.

Figure 5:
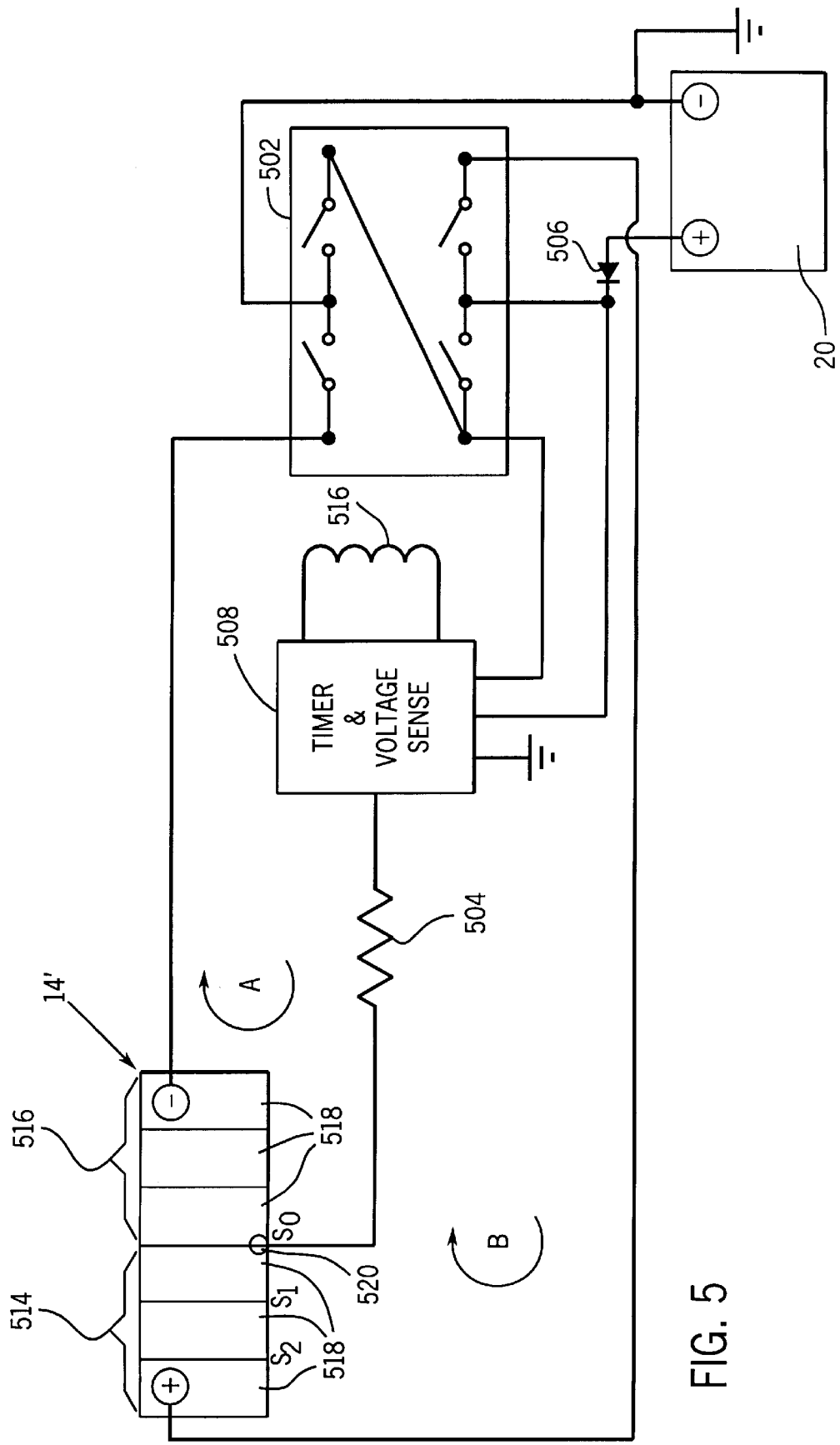
FIG. 5 is a diagram of a dual-battery system for vehicle starting in accordance with an alternate preferred embodiment of the present invention.

With reference now to FIG. 5 still another embodiment of charge maintenance device 20 is shown as circuit 500 for use with a modified starting battery which is indicated for clarity as 14'. Starting battery 14' is partitioned into two battery portions 514 and 516. Each battery portion consists of a group of cells of starting battery 14' less than the total number of cells. A voltage tap 520 is provided for selectively interconnecting each of battery portions 514 and 516 with charge maintenance device 22. The number of cells in each of battery portions 514 and 516 may vary, but the number of cells is limited such that the voltage potential of each of battery portions 514 and 516 is sufficiently below the voltage potential of reserve battery 20. In this regarding, starting battery 14' may have a total voltage potential exceeding that of reserve battery 20. For example, starting battery 14' may be a 14, 16 or greater volt battery, yet each battery portion 514 and 516 is maintained at or below approximately 10 volts (and shown in the this example as 6 volts each.) Hence, the charge of starting battery 14' may be maintained by reserve battery 20 notwithstanding starting battery 14' having a greater voltage.

With continued reference then to FIG. 5, circuit 500 includes a first current path, indicated by arrow "A" and a second current path indicated by arrow "B". Circuit 500 further includes relay 502 which has at least two, and preferably three, operating positions controlled by selective energization of coil 516 by controller 508 (controller 508 is shown separate from controller 30, but its functions may easily be incorporated into controller 30). In a first position, relay 502 couples reserve battery 20 to battery portion 516 along current path "A" consisting of blocking diode 506, controller 508, limit resistor 504 and tap 520. In a second position, relay 502 coupled reserve battery 20 to battery portion 514 along current path "B" consisting of tap 520, limit resistor 504 and controller 508. In a third position, relay 502 uncouples reserve battery 20 from starting battery 14'. While not shown, it should be appreciated that additional switching may be added to circuit 500 for coupling starting battery 14' and reserve battery 20 in parallel as previously described.

In accordance with the preferred implementations of the present invention, controller 508 selectively couples battery portions 514 and 516 to reserve battery 20 for maintaining the charge of each portion. Controller may operate in response to a voltage of the battery portion falling below a threshold, a sensed state-of-charge condition, a timed schedule or other conditions. As will be appreciated any number of charging strategies may be employed without departing from the fair scope of the invention. In one preferred implementation, when one or the other of battery portions 514 and 516 voltage falls below a threshold, that portion is coupled to reserve battery 20 for a time period and then the other portion is coupled for a time period. In this manner, the total voltage potential of starting battery 14' is maintained.

The present invention has been described in terms of several preferred embodiments of batteries and battery systems adapted for use in vehicles. Its scope, however, is not limited to the examples presented herein, and one of ordinary skill in the art will readily appreciate its broad application.

We claim:

1. A circuit for controlling the charging of a starting charge energy source in a vehicle and for controlling a supply of charge from a reserve charge energy source and an alternator in the vehicle, the circuit comprising:

a charge maintenance device including
a first circuit branch coupling the starting charge energy source and the reserve charge energy source and the alternator for charging the starting charge energy source when the vehicle is running,
a second circuit branch coupling the starting charge energy source and the reserve charge energy source and the alternator for charging the starting charge energy source when the vehicle is running or not running, and
a switchable device connected to the second circuit branch to control flow of current through the second circuit branch; and a controller operably connected to sense the level of charge on the starting charge energy source, the controller enabling and disabling the switchable device to connect and disconnect the second circuit branch between the starting charge energy source and the reserve charge energy source in response to the level of voltage on the starting charge energy source.

2. The circuit of claim 1 wherein:

the charge maintenance device further includes a third circuit branch coupling the starting charge energy source and the reserve charge energy source and the alternator for charging the starting charge energy source when the vehicle is running or not running.

3. The circuit of claim 2 wherein:

the third circuit branch comprises a diode and a resistor connected in series.

4. The circuit of claim 3 wherein:

the charge maintenance device further includes a second switchable device connected to the third circuit branch to control flow of current through the third circuit branch, and the controller enables and disables the second switchable device to connect and disconnect the third circuit branch between the starting charge energy source and the reserve charge energy source in response to the level of voltage on the starting charge energy source.

5. The circuit of claim 1 wherein:

the first circuit branch includes a current flow inhibitor to substantially inhibit current flow to the starting energy source when the vehicle is not running.

6. The circuit of claim 5 wherein:

the current flow inhibitor comprises at least one diode positioned in the first circuit branch between the starting charge energy source and the reserve charge energy source.

7. The circuit of claim 1 wherein:

the starting charge energy source is a battery optimized for a high rate of discharge during vehicle starting operations and the reserve charge energy source is a battery optimized for total energy capacity.

8. The circuit of claim 1 wherein:

the controller is operable to enable the switchable device to connect the second circuit branch between the starting charge energy source and the reserve charge energy source in response to a level of voltage on the starting charge energy source below a lower threshold voltage.

9. The circuit of claim 1 wherein:

the controller is operable to disable the switchable device to disconnect the second circuit branch between the starting charge energy source and the reserve charge energy source in response to a level of voltage on the starting charge energy source above an upper threshold voltage.

10. The circuit of claim 1 wherein:

the controller is operable to enable the switchable device to connect the second circuit branch between the starting charge energy source and the reserve charge energy source for a predetermined time period.

11. The circuit of claim 1 wherein:

the controller is operable to enable the switchable device to connect the second circuit branch between the starting charge energy source and the reserve charge energy source in response to an environmental condition.

12. A circuit for controlling the charging of a starting battery in a vehicle and for controlling a supply of charge from a reserve battery in the vehicle, the starting battery having a number of cells, the circuit comprising:

means for partitioning the starting battery into a battery portion having less than the number of cells of the starting battery, the battery portion having a voltage potential less than the voltage potential of the reserve battery;

a charge maintenance device including
a first circuit path coupling the battery portion and the reserve battery for charging the battery portion, and
a switchable device connected to the first circuit path to control flow of current through the first circuit path; and a controller operably connected to sense a level of charge on the battery portion, the controller enabling and disabling the switchable device to connect and disconnect the reserve battery and the battery portion in response to the level of charge on the battery portion.

13. The circuit of claim 12 wherein:

the starting battery has a second battery portion having less than the number of cells of the starting battery, the second battery portion having a voltage potential less than the voltage potential of the reserve battery, the charge maintenance device further includes a second circuit path coupling the second battery portion and the reserve battery for charging the second battery portion, the switchable device is connected to the second circuit path to control flow of current through the second circuit path, and the controller is operably connected to sense a level of charge on the second battery portion, the controller enabling and disabling the switchable device to connect and disconnect the reserve battery and the second battery portion in response to the level of charge on the second battery portion.

14. The circuit of claim 13 wherein:

the charge maintenance device further includes a third circuit path coupling the starting battery and the reserve battery for charging the starting battery, the switchable device is connected to the third circuit path to control flow of current through the third circuit path, and the controller is operably connected to sense a level of charge on the starting battery, the controller enabling and disabling the switchable device to connect and disconnect the reserve battery and the starting battery in response to the level of charge on the starting battery.

15. The circuit of claim 12 wherein:

the means for partitioning the starting battery is a voltage tap.

16. The circuit of claim 12 wherein:

the starting battery is optimized for a high rate of discharge during vehicle starting operations and the reserve battery is optimized for total energy capacity.

17. The circuit of claim 12 wherein:

the controller is operable to enable the switchable device to connect the battery portion to the reserve battery in response to a level of voltage on the battery portion below a lower threshold voltage.

18. The circuit of claim 12 wherein:

the controller is operable to disable the switchable device to disconnect the battery portion from the reserve battery in response to a level of voltage on the battery portion above an upper threshold voltage.

19. The circuit of claim 12 wherein:

the controller is operable to enable the switchable device to connect the battery portion to the reserve battery for a predetermined time period.

* * * * *